(12) United States Patent
Kamman

(10) Patent No.: US 7,591,330 B2
(45) Date of Patent: Sep. 22, 2009

(54) FLUID RESERVOIR

(75) Inventor: Kenneth Kamman, Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 738 days.

(21) Appl. No.: 11/245,918

(22) Filed: Oct. 7, 2005

(65) Prior Publication Data

US 2007/0080014 A1    Apr. 12, 2007

(51) Int. Cl.
*F04B 35/00* (2006.01)
*B60K 17/28* (2006.01)

(52) U.S. Cl. ............... 180/53.4; 180/417; 417/360; 417/36; 417/540

(58) Field of Classification Search ........... 180/53.4, 180/417; 417/360, 36, 540
See application file for complete search history.

(56) References Cited

U.S. PATENT DOCUMENTS

| | | | |
|---|---|---|---|
| 4,380,272 A | | 4/1983 | Merz |
| 4,399,966 A | * | 8/1983 | Crudden et al. .......... 244/129.4 |
| 4,917,069 A | * | 4/1990 | Kuhlen ..................... 123/509 |
| 5,104,294 A | | 4/1992 | Banba |
| 5,772,408 A | | 6/1998 | Hada et al. |
| 6,358,020 B1 | | 3/2002 | Staton et al. |
| 6,390,783 B1 | | 5/2002 | Wong et al. |
| 6,499,970 B1 | * | 12/2002 | Siegel et al. ............ 417/410.1 |
| 6,675,577 B2 | * | 1/2004 | Evans ....................... 60/445 |
| 7,004,206 B2 | * | 2/2006 | Viken et al. ................. 141/1 |
| 7,007,654 B2 | * | 3/2006 | Aliev ...................... 123/196 S |
| 7,052,230 B2 | * | 5/2006 | Beaven et al. .............. 415/65 |
| 7,309,218 B1 | * | 12/2007 | Lewis et al. ............... 417/360 |
| 7,354,511 B2 | * | 4/2008 | Becker ................... 210/167.02 |
| 2004/0241016 A1 | | 12/2004 | Beaven et al. |

\* cited by examiner

*Primary Examiner*—Lesley D Morris
*Assistant Examiner*—Marlon A Arce
(74) *Attorney, Agent, or Firm*—Fredrick Owens

(57) ABSTRACT

A power assist system for a motor vehicle subsystem having a component support structure is described. The power assist system comprises a fluid reservoir, a pump having an inlet for receiving a fluid from the reservoir and a pump securing structure including at least one aperture. The system additionally includes at least one fastener. The reservoir fluid outlet is directly coupled to the pump inlet and the at least one fastener secures the reservoir mounting structure by passing directly through the pump mounting structure and attaching to the motor vehicle component support structure.

13 Claims, 3 Drawing Sheets

FLUID RESERVOIR

BACKGROUND OF THE INVENTION

1. Field of the Invention

The present invention relates to a fluid power assist system for a motor vehicle. More specifically, this invention relates to a fluid power assist system having a fluid reservoir in cooperation with a pump for a motor vehicle.

2. Prior Art

Conventional vehicles employ power assistance systems in many ways. Power assisted brakes and power assisted steering are just two of such applications. Power assisted steering systems are systems in which the steering force is produced by the driver's muscular energy and by an energy source within the vehicle. For this purpose, a hydraulic oil, which is pressurized by means of a pump and serves to generate or increase the steering power, is provided in a closed system. Power assisted brakes work in a similar manner. The energy source may comprise a vacuum booster for a brake system or a pump driven by flywheel for a steering system. These systems typically include an oil reservoir and the corresponding hoses and pipes which transfer the fluid through the system.

Conventional vehicle power steering systems may mount the oil reservoir on the body structure underneath the hood. In these systems, the power steering oil or fluid is typically collected in the power steering oil reservoir after its use by the steering gear and then supplied to the pump through a large diameter suction hose. The design of this system has its drawbacks. First, the suction hose offers poor under hood appearance. Competition between Original Equipment Manufacturers (OEMs) is fierce in today's marketplace. Under-hood craftsmanship is another area in which OEMs can attempt to differentiate their brand. Second, the suction hose is a costly item. The under-hood hose material is often required to have increased durability and performance requirements. These hoses are often long and must be formed in order to effectively negotiate other components located in the engine compartment. The forming also increases its piece cost. The size of the suction hose requires additional fluid in the system in order to operate the steering system. The assembly costs are increased because of the size of the hoses and overall system, more evacuation and field time is required in the assembly plant. Third, power steering hoses also provide opportunities for leakage which can be a nagging warranty item. Finally, the more fluid required to be pushed through the system requires more energy and adds to fluid consumption. Therefore, what is needed is a power assist system which is better designed for assembly and reduces labor time, eliminates unnecessary parts, reduces warranty, improves under hood appearance, and offers a more efficient and cost saving system.

SUMMARY OF THE INVENTION

According to the present invention, a power assist system for a motor vehicle subsystem, the motor vehicle having a component support structure comprises a fluid reservoir having a reservoir fluid outlet, a return fluid inlet for receiving fluid, and a reservoir mounting structure. The power assist system further comprises a pump having an inlet for receiving the fluid from the reservoir, a pump outlet for providing the fluid, and a pump securing structure including at least one aperture. Additionally, the system includes at least one fastener for securing the reservoir mounting structure to the motor vehicle component support structure. The fastener secures the reservoir mounting structure by passing directly through the pump securing structure aperture and attaching to the component support structure.

The invention has the advantage of removing costs from a vehicle's power assist system. The elimination of the main suction hose, the hose's associated clamps, as well as a reservoir mounting bracket, result in a smaller and more efficient system. In contrast, the conventional system results in a suction hose full of fluid. In the preferred embodiment, the amount of fluid required in the overall system is reduced as well.

The invention has the further advantage of providing a more efficient and flexible power assist system without realizing the high costs of development that accompany the redesign of a conventional variable displacement pump integral to power assist systems. The power assist system described here takes advantage of an existing pump design and mounts the reservoir mounting structure by passing directly through the pump securing structure aperture and attaching to the component support structure. Although many of the pumps having reservoirs directly integrated into their housing exist today to provide space savings, the savings come with disadvantages of a high cost and a loss of flexibility. The cost associated with retooling and redesigning the molds for a pump to make the reservoir an integral part of a pump is a significant amount. Additionally, in the undesired circumstance that the reservoir portion fails, there is no way to "limp home" since removing the reservoir renders the pump useless. In contrast, the system described herein allows for the old reservoir to be removed and a temporary reservoir to be substituted into the system with hoses and clamps, etc. For work vehicles such as trucks and farm equipment used in remote locations, the flexibility of a vehicle subsystem is often beneficial.

According to a further object of the present invention, a method of providing a reservoir for a fluid power assist system in a motor vehicle having a component support structure is attained. The fluid power assist system has a pump and at least one reservoir fastener. The reservoir has a chamber, a reservoir fluid supply outlet, a fluid return inlet, and a reservoir mounting including a securing aperture. The pump includes a pump securing structure containing an aperture, a pump inlet. The method comprises the steps of directly coupling the reservoir fluid supply outlet port to the pump inlet, aligning axially the reservoir mounting securing aperture and the pump mounting aperture, inserting one end of the reservoir fastener through both the reservoir mounting securing aperture and the pump mounting aperture to the motor vehicle component support structure, and securing the reservoir fastener into the motor vehicle component support structure.

According to a further object of the present invention, a reservoir for a pump having a fluid inlet and a pump mounting structure containing at least one securing aperture comprises an internal fluid chamber, a fluid outlet, and a reservoir mounting structure having a securing aperture. The reservoir fluid outlet connects directly to the pump fluid inlet and the reservoir securing aperture aligns with one of the at least pump securing apertures.

The invention has the further advantage of reducing plant labor time. The elimination of the reservoir mounting bracket and the suction hose and its corresponding clamps, results in fewer parts to assemble. Furthermore, since one reservoir fluid outlet connects directly to the pump fluid inlet and the reservoir surface is in close proximity to the a pump surface, the two components tend to orient themselves into position during loose assembly allowing the reservoir and the pump to be assembled into final position without additional clamping.

The invention has the further advantage of improving the under hood appearance of the power assist system. The removal of the formed suction hose provides a simple, compact system with improved underhood craftsmanship.

The invention has the further advantage of providing improving the power assist system while maintaining the flexibility to end user of the motor vehicle in the event of a reservoir failure of the power assist system in the field.

Because the reservoir is not integrated into the housing of the pump, the power assist system will still function if supplied with fluid. In the event the reservoir fails in the field, it can be temporarily replaced by a conventional reservoir that can receive and supply fluid to the system using conventional pipes and suction hoses. For commercial vehicles operating in remote locations, the ability to reduce the time and expense to recover a stranded vehicle is of value.

The above and other objects, features, and advantages of the present invention will become more apparent for the following description when taken in conjunction with the accompanying drawings in which a preferred embodiment of the present invention is shown by way of the illustrative examples.

BRIEF DESCRIPTION OF THE DRAWINGS

Presently preferred embodiments of the invention are disclosed in the following description and in the accompanying drawings, wherein.

DETAILED DESCRIPTION OF THE PREFERRED EMBODIMENTS

Figure 1:
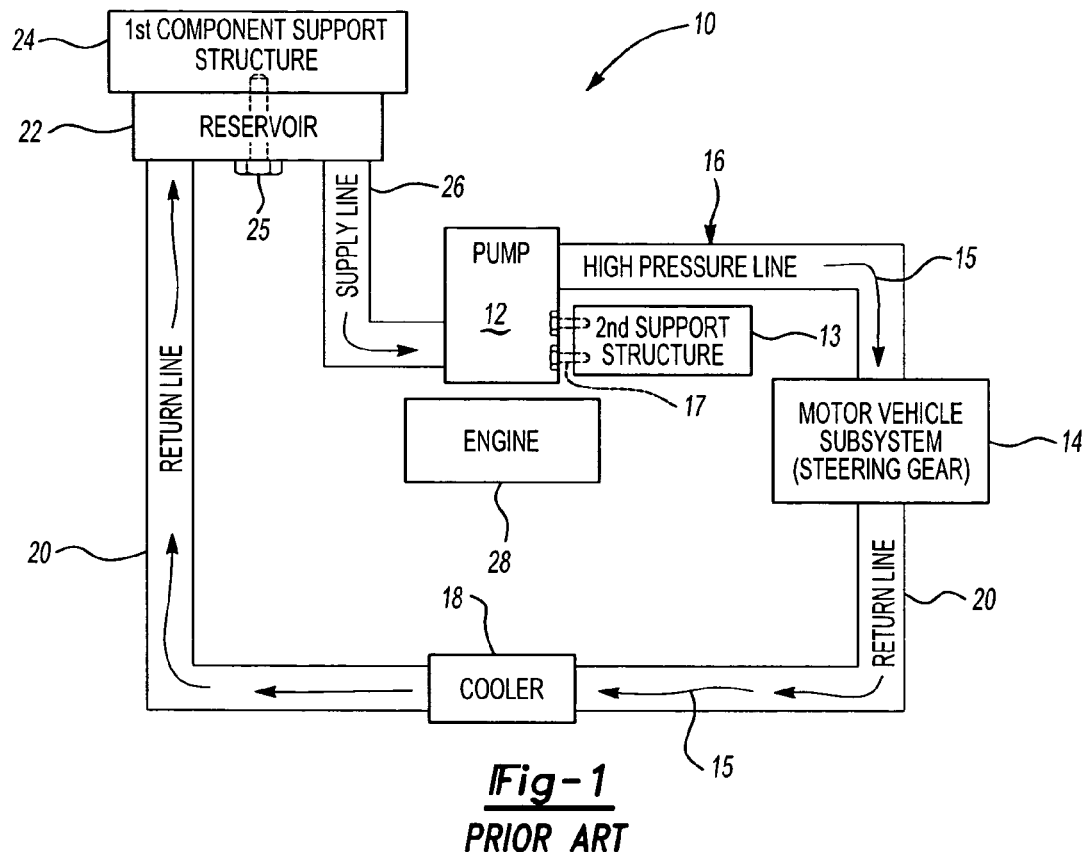
FIG. 1 is a schematic diagram of a prior art power assist system.

Referring to FIG. 1, a prior art power assist system 10 is schematically shown comprising a pump 12 for supplying a motor vehicle subsystem 14 with fluid 15 using a high pressure line 16. Pump 12 may be a variable displacement or a positive fixed hydraulic pump such as a power steering pump, oil pump, transmission pump, etc. A return line 20 transfers fluid 15 between the motor vehicle subsystem 14 and a reservoir 22. An optional cooler 18 is often found in such systems to reduce the temperature of the fluid 15 exiting the motor vehicle subsystem 14 and prior to returning to the reservoir 22. The reservoir 22 is typically secured to a first vehicle component support structure 24 such as a vehicle body, frame or a portion of an engine using reservoir fasteners 25. The reservoir fasteners 25 may be bolts, such as hex head carriage bolts, screws, or any other conventional fastener. Supply line 26 provides fluid 15 returned or stored in the reservoir 22 to pump 12. The supply line 26 may be a suction hose in conventional vehicles. The pump 12 is secured to a second vehicle component support structure 13 using pump fasteners 17. In a conventional motor vehicle, the first vehicle component support structure 24 and the second vehicle component support structure 13 are typically located in the engine compartment in distinctly separate locations. The pump 12 is typically powered thru a pulley connected to the engine 28. In the alternative, an electric motor may be used to supply power to the pump 12. Similar to the first vehicle support structure 24, the second vehicle support structure 13 may be a bracket formed by body or frame structure, or some other vehicle component, such as engine 28. The motor vehicle subsystem 14 may be a steering gear of a power steering system, a power brake system, or other such type of system.

Figure 2:
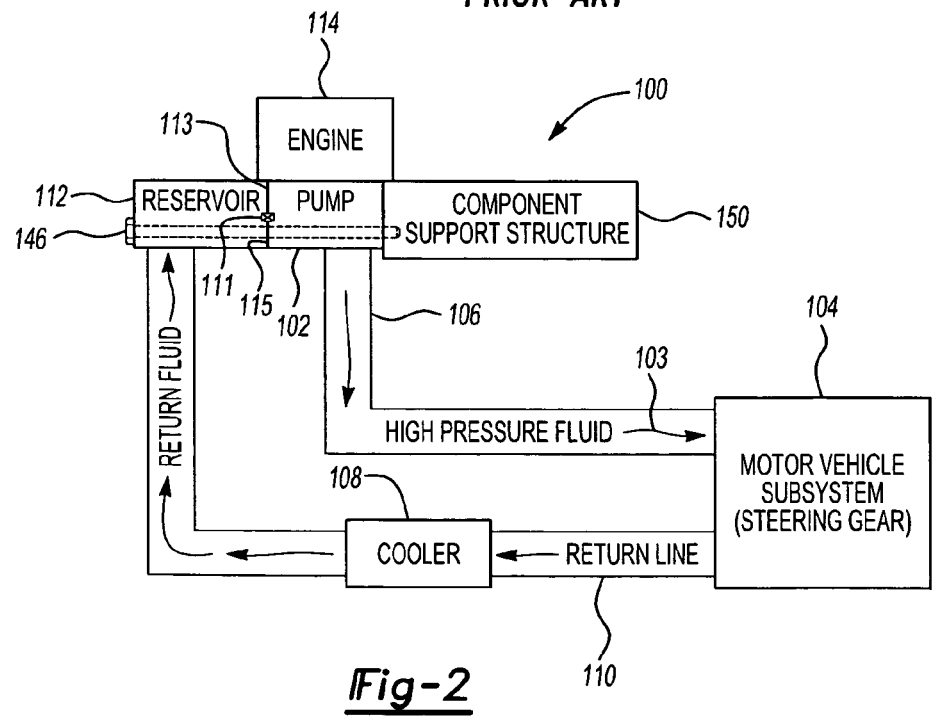
FIG. 2 is a schematic diagram of one embodiment of a power assist system according to the invention.

FIG. 2 is a schematic diagram of a power assist system according to the present invention. A power assist system 100 comprises a pump 102 providing a volume of high pressure fluid 103 to a motor vehicle subsystem 104 by means of a high pressure line 106. The high pressure line is a conventional pressure line and may be a pipe made of a metal material. Pump 102 may be powered by an engine 114 thru a pulley (not shown). In the alternative, the motor vehicle subsystem 104 may be a steering gear of a steering system, a brake system, or other motor vehicle subsystem 104 requiring power assistance. Fluid 103 is returned through a return line 110 to a reservoir 112. The return line 115 may be a pipe fabricated out of a metal material. An optional cooler 108 may exist in between the motor vehicle subsystem 104 and the reservoir 112 to serve as a conventional heat exchanger in order to reduce the temperature of the fluid 103 prior to entry into the reservoir 112. The reservoir 112 has an exterior surface 113 in close proximity with a surface 115 of the pump such that both surfaces abut against each other. An interface connection 111 between the pump 102 and the reservoir 112 allows the fluid 103 to transfer directly from inside the reservoir 112 to inside the pump 102 without need for a suction hose. Reservoir 112 is secured in place by one or more fasteners 146 passing through a portion of the reservoir 112, a portion of the pump 102, and received by a vehicle component support structure 150.

Figure 3:
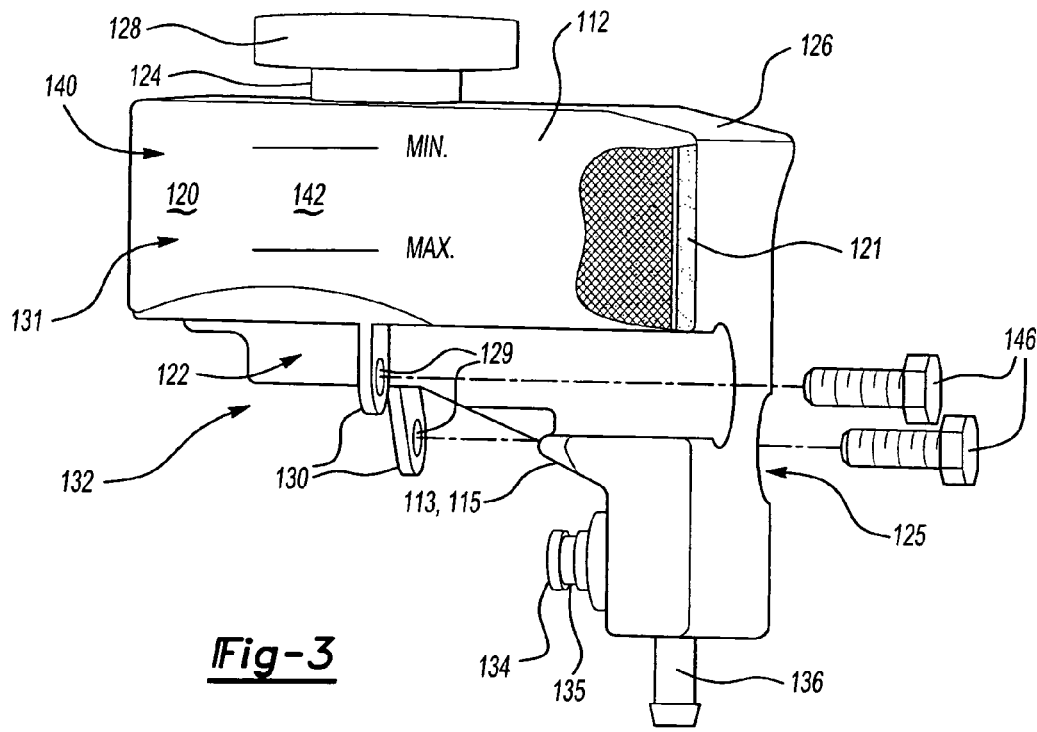
FIG. 3 is a side view of a fluid reservoir according to the invention.
Figure 5:
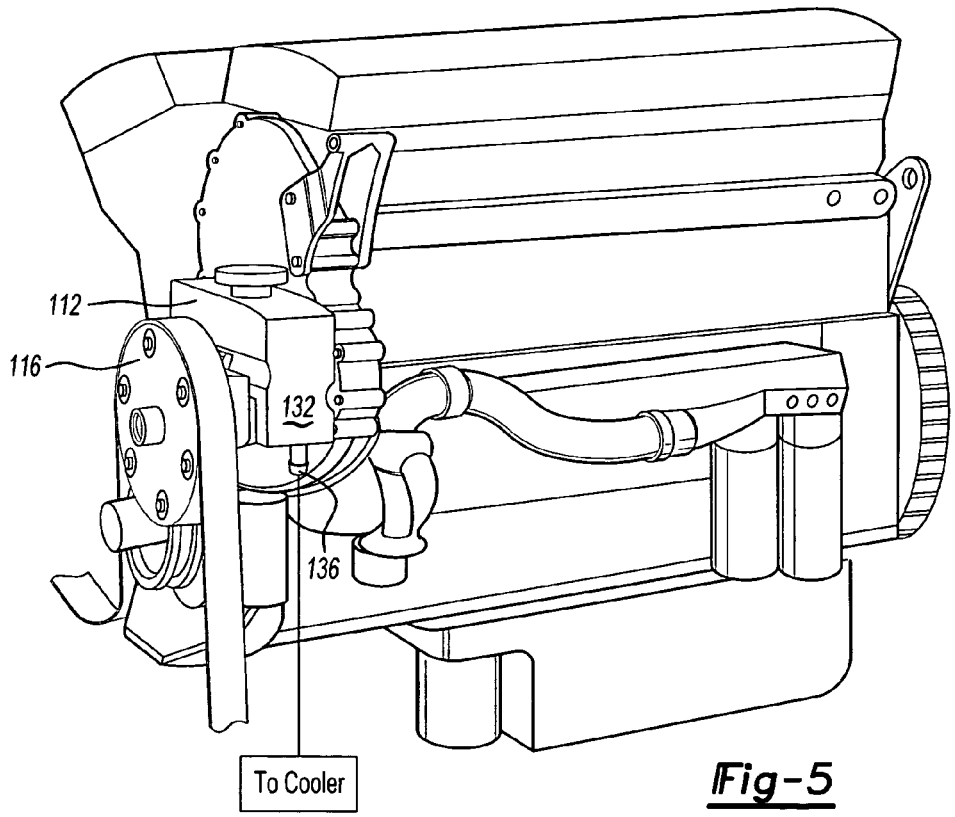
FIG. 5 is a perspective view of a portion of a power assist system according to the invention.
Figure 4:
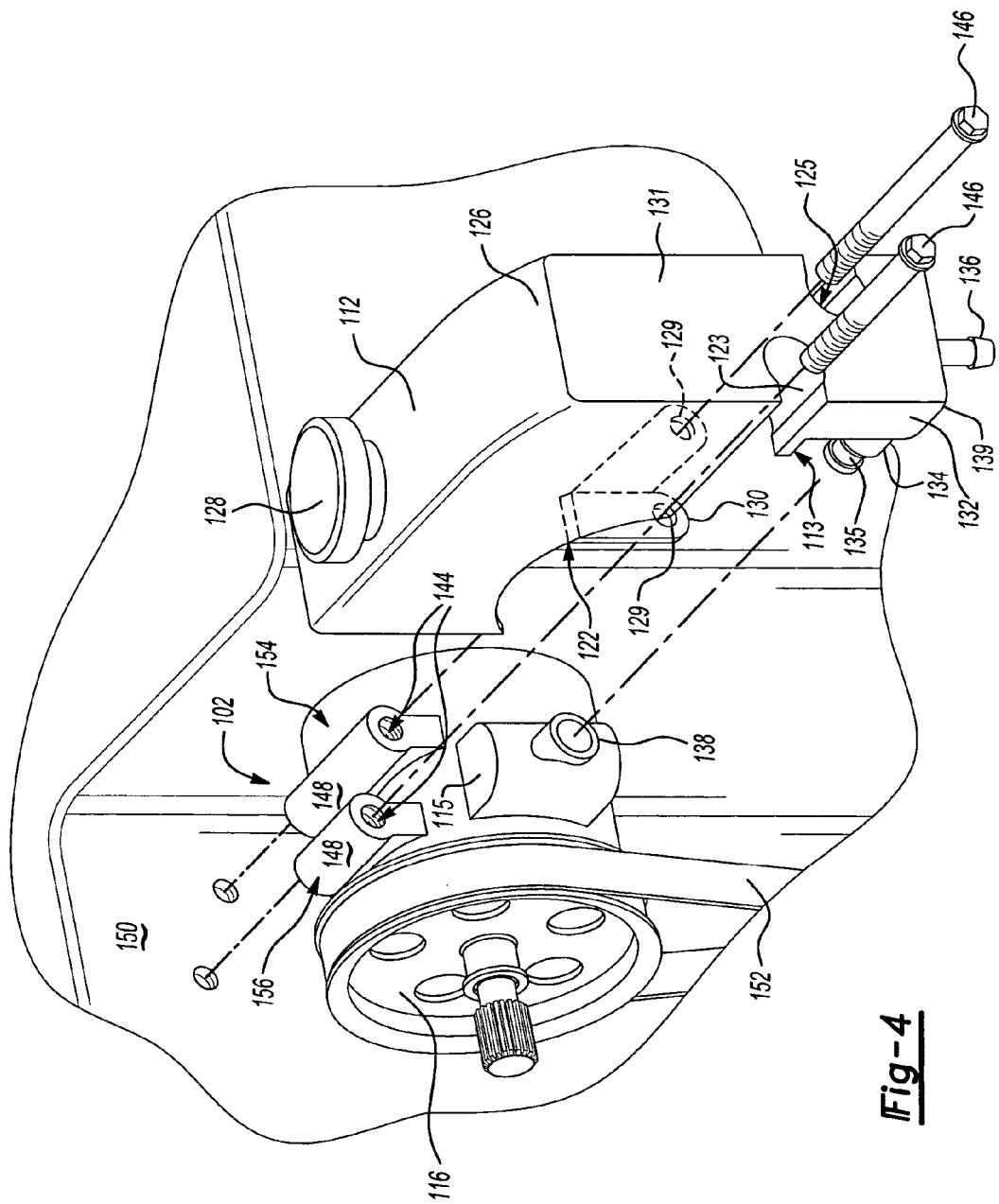
FIG. 4 is an exploded view of a portion of a power assist system according to the invention.

Referring now to FIGS. 3-5, FIG. 3 is a side view of reservoir 112 according to one embodiment of the present invention. An upper portion 131 of the reservoir is formed in a rectangular shape and comprises an internal chamber 140 for containing the bulk of the fluid. Inside the reservoir 112, a strainer 121 is located for filtering fluid. A filler neck 124 is located on a top surface 126 to allow additional fluid needed by the system to be poured from above the reservoir 112 into the chamber 140. The reservoir 112 may be sealed by a cap 128 or similar functional component. Optionally, one surface of the chamber 120 may comprise a fill max and min indicator 142 to aid in adding additional fluid 103. Alternatively, a fill indicator may be included as a portion of cap 128.

Reservoir 112 is constructed of man-made materials such as a glass-filled nylon. The exterior of the upper and lower portions 131, 132 may be injection molded. In the alternative other molding methods such as cold molding processes may be used.

A lower portion of the reservoir 132 comprises a reservoir fluid outlet port 134 and a return inlet 136. The lower portion 132 is smaller in size compared to the upper portion 131 and formed toward one end of the reservoir 112. The relationship between lower portion 132 and upper portion 131 aids in allowing the fluid outlet port 134 to have clearance to a pump connection. The reservoir fluid outlet port 134 extends away from the lower portion 132 to allow for an interface with a pump (not shown). The outlet port 134 may be formed with a circular end and comprise a seat 135 for use in combination with an o-ring. The reservoir fluid outlet 134 is formed to allow for a flush mating connection with a pump inlet port (not shown) to provide for the discharge of fluid to the pump. A reservoir return inlet 136 extends from a bottom surface 139 for receiving pressurized fluid from a return line from a motor vehicle system.

The upper and lower portion 131, 132 respectively are formed and adapted to aid in the mounting and securing of the reservoir in close proximity to a pump. An exterior surface of the reservoir 122 is formed by the upper portion 131 and the lower portion 132 to allow the reservoir to align itself with relevant portions of the pump. The reservoir 112 has a mounting structure 130 adapted for securing the reservoir in close proximity to the pump. The mounting structure 130 comprises a two vertical elements extending from upper portion 131. A reservoir mounting aperture 129 is present in each vertical element to aid in securing the reservoir 112. Apertures 129 allow fasteners 146 to pass through and secure the reservoir 112 in place. Surface 122 extends horizontally along the lower portion 132 to forms a clearance for one of the fasteners 146 to one of the apertures 129 located in the mounting structure 130. A surface 125 is similarly formed to provide clearance for one of the fasteners 146 which extends horizontally along the lower portion 132 in a lower vertical plane arranged parallel to surface 122.

Referring to FIG. 4, an exploded view of an embodiment of a pump 102 and reservoir 112 according to the invention is described. Pump 102 is cylinder-shaped body shown powered by a belt 152 connected to a motor vehicle engine (not shown) thru a pulley 116. The pump is supported by a vehicle component support structure 150 in the form of a body support panel. In an alternative embodiment, the vehicle component support structure 150 may be a firewall or body-in-white framing made from sheet metal. Pump inlet port 138 is a circular-shaped female connector extending horizontally from the pump 102. Pump securing structures 148 extend horizontally along an upper surface 154 of the pump 102. The pump securing structures 148 are each defined by an aperture 144 and a cylindrical passage 156 extending throughout its length.

When reservoir 112 is in its ideal final position, the mounting apertures 129 of the reservoir mounting structure 130 are aligned with pump securing apertures 144. Reservoir exterior surface 122 is in close proximity with the securing structure 148 of the pump 102. The exterior surface 122 is formed to allow it to lie beside the pump securing structures 148. The fluid outlet port 134 engages pump inlet port 138. The connection allows fluid to transfer directly from the reservoir 112 to inside the pump 102 without need for a suction hose. An o-ring or similar may be used in combination with the fluid outlet 134 to provide a seal for the press or slip-fit connection. Reservoir 112 is secured in place by one or more fasteners 146 passing through a reservoir through reservoir mounting apertures 129 and through the pump securing apertures 144. Each of the fasteners 146 is received by the vehicle component support structure 150, thereby securing the reservoir 112.

FIG. 5 is a perspective view of a fluid reservoir of a power assist system according to the invention. The reservoir 112 is shown in an operable position located behind the pulley 116 of a pump 102. Reservoir 112 is adapted to lie beside or abut against an external surface of the pump (not shown). By aligning the reservoir 112 to lie beside a surface of the pump, reservoir fluid outlet and the pump fluid inlet are brought into close proximity to each other and the need for a long suction hose between the reservoir and the pump is further eliminated. The return line 110 returns fluid 103 to the reservoir through a return inlet 136 located on a lower portion 132 of the reservoir 112.

A method of providing fluid for a power assist system in a motor vehicle will now be further described. First the reservoir fluid supply outlet port is coupled directly to the pump inlet port. Next, the reservoir mounting structure aperture is aligned with the pump securing structure aperture in order to receive the reservoir fasteners. Third, one end of the reservoir fastener is inserted through both the aligned portions of the reservoir mounting structure aperture and the pump securing structure aperture. Fourth, the reservoir fastener is secured to the motor vehicle component support structure.

Although there have been described what are at present considered to be the preferred embodiments of the invention, it will be understood that the invention may be embodied in other specific forms without departing from the essential characteristics disclosed. The present embodiment is to be considered in all respects as illustrative, and not restrictive. The scope of the invention is indicated by the claims which follow rather than by the foregoing description.

I claim:

1. A power assist system for a motor vehicle subsystem, the motor vehicle having a component support structure, the power assist system comprising:
   a fluid,
   a fluid reservoir having a reservoir fluid outlet, a return fluid inlet for receiving fluid, and a reservoir mounting structure;
   a pump having an inlet for receiving the fluid from the reservoir, a pump outlet for providing the fluid, and a pump securing structure including at least one aperture;
   a fluid supply line from the pump outlet to the motor vehicle subsystem;
   a fluid return line from the motor vehicle subsystem to the reservoir return inlet; and,
   at least one fastener for securing the reservoir mounting structure to the motor vehicle component support structure
   wherein the at least one fastener secures the reservoir mounting structure by passing directly through the pump securing structure aperture and attaching to the component support structure.

2. A power assist system according to claim 1, wherein the reservoir is located directly adjacent to the pump.

3. A power assist system according to claim 2, further comprising at least one reservoir external surface and at least one pump external surface wherein the surfaces compliment each other.

4. A power assist system according to claim 3, wherein a portion of the reservoir external surface rests against a portion of the external surface of the pump.

5. A power assist system according to claim 1, wherein the reservoir fluid outlet is directly coupled to the pump inlet.

6. A power assist system according to claim 2, wherein the reservoir mounting structure comprises at least one aperture for receiving fasteners.

7. A power assist system according to claim 2, wherein the pump securing structure comprises at least one aperture to allow the fastener to attach to the motor vehicle component support structure.

8. A power assist system according to claim 1, wherein the motor vehicle component support structure is an engine.

9. A power assist system according to claim 1, wherein the motor vehicle component support structure is a frame.

10. A power assist system according to claim 8, wherein a securing apertures in the reservoir mounting structure is axially aligned with the at least one aperture in the pump securing structure.

11. A power assist system according to claim 1, wherein the motor vehicle subsystem is a power steering gear.

12. A power assist system according to claim 1, wherein the motor vehicle subsystem is a brake system.

13. A power assist system according to claim 1, further comprising a cooler for reducing the temperature and pressure of the fluid in the return line.

* * * * *